(12) United States Patent
Bourgeois (10) Patent No.: US 9,410,301 B2
(45) Date of Patent: Aug. 9, 2016

(54) PATCH SYSTEM AND METHOD FOR OIL BOOM

(71) Applicant: Theophile Bourgeois, Barataria, LA (US)

(72) Inventor: Theophile Bourgeois, Barataria, LA (US)

( * ) Notice: Subject to any disclaimer, the term of this patent is extended or adjusted under 35 U.S.C. 154(b) by 21 days.

(21) Appl. No.: 14/564,757

(22) Filed: Dec. 9, 2014

(65) Prior Publication Data

US 2016/0160464 A1    Jun. 9, 2016

(51) Int. Cl.
*E02B 15/08* (2006.01)

(52) U.S. Cl.
CPC .................................... *E02B 15/085* (2013.01)

(58) Field of Classification Search
USPC ....................................................... 405/66, 70
See application file for complete search history.

(56) References Cited

U.S. PATENT DOCUMENTS

| | | | | |
|---|---|---|---|---|
| 3,685,296 A * | 8/1972 | Bogosian | ................ | E02B 15/08 405/70 |
| 5,362,180 A * | 11/1994 | Canning | ............. | E02B 15/0807 405/63 |
| 5,409,607 A * | 4/1995 | Karlberg | ................ | E02B 15/048 210/242.3 |
| 5,711,634 A * | 1/1998 | Oberg | ...................... | E02B 15/08 405/63 |
| 6,554,534 B1 * | 4/2003 | Butterfield | ........... | A01K 61/007 405/24 |
| 2003/0072616 A1 * | 4/2003 | Dreyer | .................... | E02B 15/06 405/70 |

* cited by examiner

*Primary Examiner* — Benjamin Fiorello
*Assistant Examiner* — Kyle Armstrong
(74) *Attorney, Agent, or Firm* — Keaty Law Firm LLC (57) ABSTRACT

An apparatus, system, and method for repairing or reinforcing a damaged oil containment boom. The apparatus includes two end connectors and a curtain attached between the two end connectors. The end connectors are attached to a damaged, existing boom via a vertically extending slot formed in each of the end connectors. After attachment, a tight seal is formed between the curtain and the damaged boom. The method for reinforcing a boom includes engaging the two end connectors to an existing boom while stretching the curtain over the damaged boom section in an overlapping relationship. Finally, the connectors are locked into place via a lock-pin mechanism. This invention creates a tight seal over the damaged area, creating a "patch" to keep out oil contaminants from the protected area. The disclosed invention can be used to repair, patch, or reinforce an existing oil containment boom.

23 Claims, 6 Drawing Sheets

PATCH SYSTEM AND METHOD FOR OIL BOOM

BACKGROUND

Due to an increase in oil production and oil transportation, there is an increase in accidental oil spills. Oil spills can be both devastating and disastrous to ecological and marine environments. It can also affect physical resources, as well as a wide range of organisms that are linked in a complex food chain. This food chain also includes human food resources that are essential. Oil spills can harm living things because its chemical constituents are poisonous. Various types of freshwater and marine habitats that exist in nature have different sensitivities to the harmful effects of oil contamination, as well as different abilities to recuperate. Although some organisms may be seriously injured or killed very soon after contact with the oil in a spill, other effects are more subtle and often longer lasting. For example, freshwater organisms are at risk of being smothered by oil that is carried by the current, or of being slowly poisoned by long-term exposure to oil trapped in shallow water or stream beds. In addition, oil can potentially have catastrophic effects on birds and mammals.

Oil spills can happen in open seas, as well in navigable waterways. Moreover, damage to even a moderate sized oil tanker can result in the leakage of thousands of barrels of oil into the waters around the tanker. A blow-out in an off shore oil rig, can also result in disastrous damage to the environment, as well as the economy. Furthermore, when such oil spills occur close to a shoreline, the danger of damaging fragile environmental ecosystems is considerably higher.

One method for controlling the damage of an oil spill is with the use of oil-containment systems, where inflatable "booms" surround the spill until the oil can be collected. Boom systems prevent the spill from expanding or reaching a protected area such as a shoreline, until it can be collected by mechanical means. A typical boom system employs a plurality of boom sections joined end to end. Each boom section includes a plurality of parallel inflatable chambers that are joined with a weighted curtain. The boom sections are connected by a cable on top and by a weight member (such as a chain) on the bottom. Because boom systems can remain in water for long periods of time, there are incidents where boom sections become damaged. The damage can either be caused by objects in the water, or by strong water currents. A damaged boom can be just as disastrous as the original oil spill itself. For example, a tear in a boom can no longer contain the oil, nor can it prevent oil from reaching a shoreline.

To help detect damaged booms, environmental protection agencies require that boom systems be regularly inspected. Thus, if a breach occurs, the boom must be repaired on site. Furthermore, some repairs require removal of an entire boom section, which can span over 100 ft. in length. Ideally, once a boom section is removed, another boom section is brought in to replace it. However, the time needed to remove and replace a boom section of such an enormous length can take hours. Furthermore, once the damaged boom section is removed, contaminated water will be able to flow freely upon the shoreline. This could be disastrous as miles of shoreline and plenty of wildlife will be at risk.

SUMMARY OF THE INVENTION

It is, therefore, an object of the present invention to provide an apparatus for repairing an oil-containment boom leak.

It is another object of the invention to provide a method for repairing an oil-containment boom damage that can be readily performed.

It is a further object of the invention to provide a system for repairing or reinforcing an area of an oil-containment boom that can provide protection against oil spills.

These and other objects of the invention are achieved through a provision of a oil boom repair system. The oil boom repair system includes two end connectors and a curtain attached between the end connectors. The end connectors are also used to attach the curtain to a damaged, existing boom via an opening slot in the connector. The system for repairing of replacing an existing boom includes forming a tight seal between the curtain and existing boom.

BRIEF DESCRIPTION OF THE DRAWINGS

A better understanding of the various disclosed embodiments can be obtained when the following detailed description is considered in conjunction with the accompanying drawings, in which.

DETAILED DESCRIPTION OF THE INVENTION

The problems and issues identified in the background are at least partly addressed by the apparatus, system, and methods disclosed herein. An apparatus for boom repair includes at least one end connector and a curtain attached to the end connector. The curtain is attached between two end connectors. The end connectors are also used to attach the curtain to a damaged, existing boom via an opening slot in the connector. The system for repairing of replacing an existing boom includes forming a tight seal between the curtain and existing boom.

The method for reinforcing a boom includes connecting one end of a curtain to an existing boom, and connecting another end of the same curtain to the same, existing boom. Both connections are secured in place by sliding the end connectors over the existing boom at separate areas that covers the damaged section of the existing boom. Next, the end connectors are locked in place via a lock-pin mechanism. This creates a tight seal over the damaged area, creating a "patch" to keep out oil contaminants from the protected area. The disclosed invention can be used to repair, patch, or reinforce an existing oil containment boom.

Figure 1:
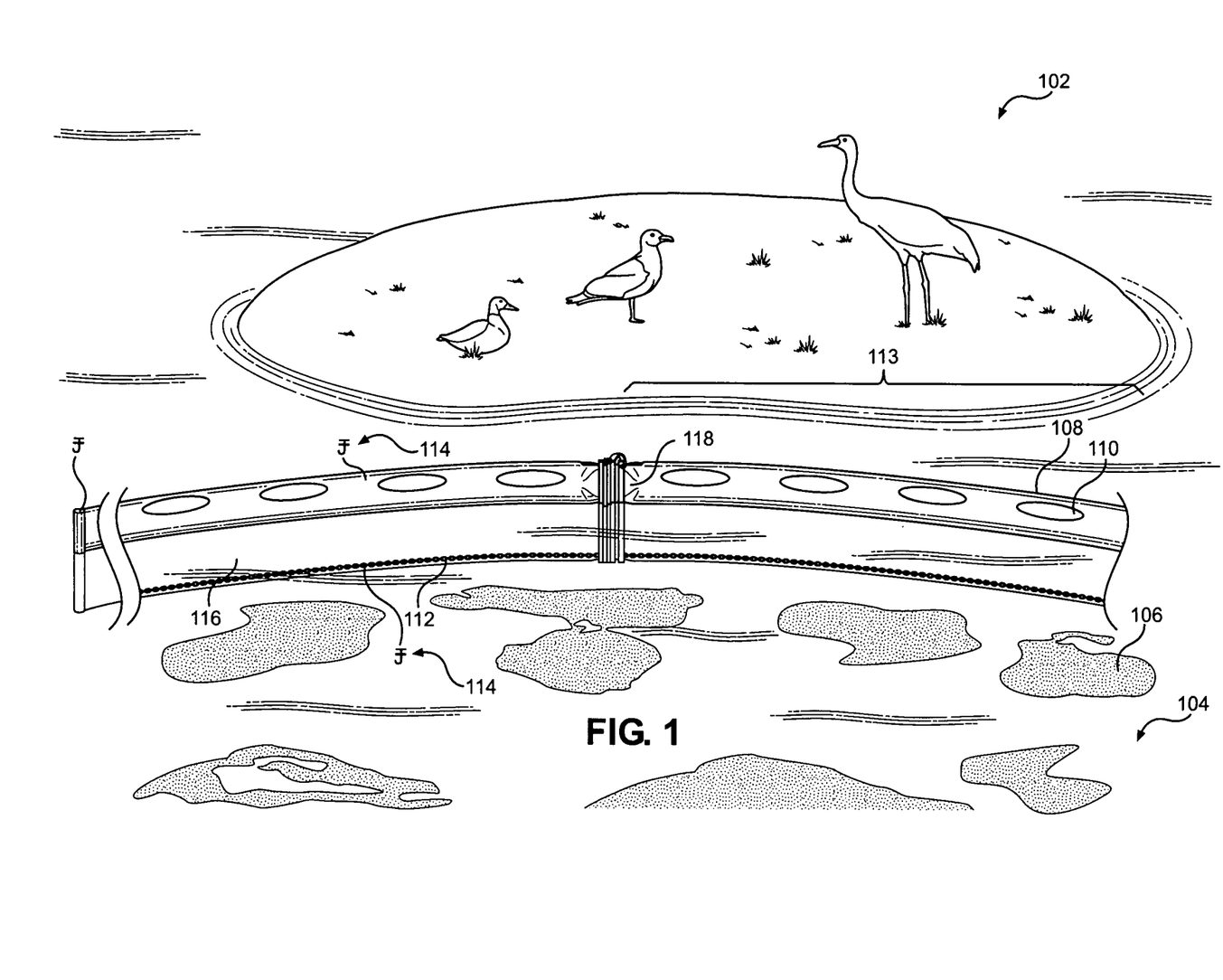
FIG. 1 is an illustrative marsh environment in which the disclosed embodiments may be employed.

The disclosed apparatus, system, and methods are best understood in a suitable usage context. Accordingly, FIG. 1 illustrates a marsh environment 102 located along a shoreline that would require protection from contaminated waters 104. The existing boom 108 is attempting to provide protection of the marsh environment 102. The existing boom 108 includes one or more floatation members 110 to provide buoyancy in the water. The existing boom 108 also includes a weighted member, such as a chain 112 to connect a boom section 113 to other boom sections or to end anchors 114. The chain 112 also serves the purpose of weighing down the curtain 116 area of the existing boom. Anchor points can be created every 50 ft along the length of the existing boom 108 by attaching anchors 114 to the chain 112 in spaced intervals. Boom sections 113 can typically be about 100 ft long in length.

Because booms 108 can remain in waters for long periods of time, there are incidents where booms 108 become damaged, as illustrated by the damaged area 118. The damaged area 118 can be created or caused by a variety of factors. Also, there can be a number of problems that would be classified as damage. For example, a boom can become torn. A tear in the boom can either be caused by random objects in the water, or by strong water currents. Another common failure that could create a damage area 118 is an excess of contaminated matter that had saturated the boom. A saturated boom losses buoyancy and can begin to sink. Thus, a damaged boom due to saturation will not provide the proper protection needed from contaminated waters 104. Further, a damaged area 118 on a boom can allow contaminated waters 104 to reach the marsh environment 102 and shoreline, causing considerable damage to the vegetation and wild life.

Conventional repairs normally require removal of an entire damaged boom section 113, which could be about 100ft in length. The replacement of an entire damaged boom section 113 could take hours to complete. Contaminated waters 104 will be able to flow freely toward the marsh environment 102 and shoreline, during replacement of the boom section 113. In addition, substantial damage can be done to the marsh environment 102 by the contaminated waters 104 during replacement of the entire boom section 113. The present invention is constructed to serve as a repair or "patch" system to the damaged area 118 of the existing boom 108, thus providing protection of the marsh environment 102 and shoreline from contaminated waters 104.

Figure 2:
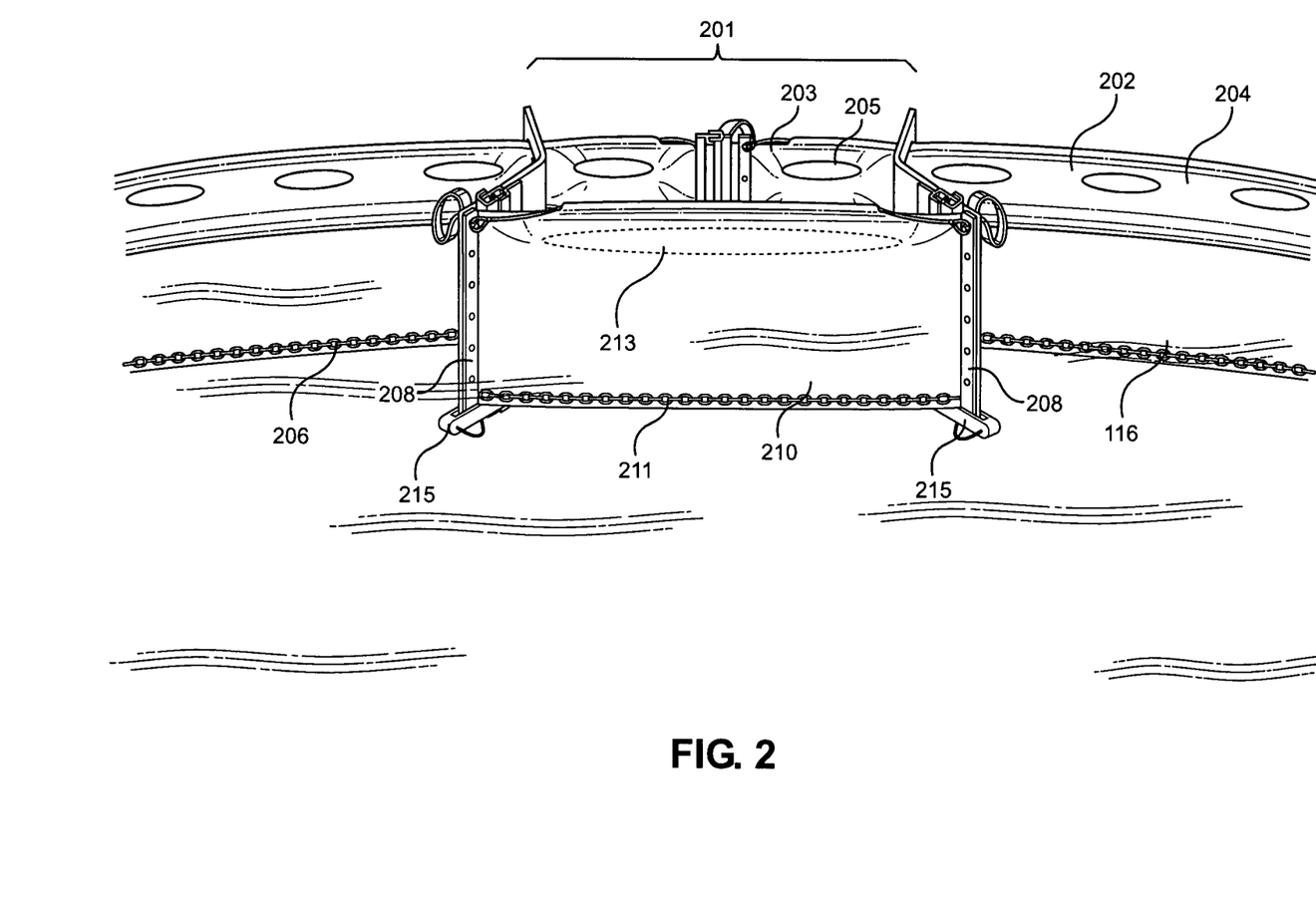
FIG. 2 is an illustrative view of the boom repair system of the presented invention position upon an existing boom section.

FIG. 2 illustrates an oil boom repair system 201 attached to an existing boom 202 affected by a damage area 203. The existing boom 202 includes a plurality of buoyant floatation members 204 to provide buoyancy in the water. The existing boom 202 also includes a weighted member, such as a chain 206, which connects adjacent boom sections to each other. The oil boom repair system 201 is attached to the existing boom 202 by end connectors 208. The oil boom repair system 201 includes a curtain member 210 that is also weighted down by chains 211. The curtain 210 also includes a flotation member 213 in its top portion. The floatation member 213 is sealed inside the curtain member. In the preferred embodiment, the floatation member can be of cylindrical configuration and formed from closed cell foam. The curtain member 210 is part of the oil boom repair system 201 and is securely attached to the end connectors 208. The end connectors are locked in place by the rigid locking bars 215. The curtain member 210 is formed from liquid-impermeable materials, for instance vinyl. Alternatively, the curtain 210 can be made of any flexible material with relatively high tensile strength and sheer strength that is liquid impermeable.

In the preferred embodiment, the end connectors 208 are designed and built with a 45° plane that helps the curtain 210 of the oil boom repair system 201 to create a tight seal 205 upon the damage area 203 of the existing boom 202. In the embodiment shown in FIG. 2, the damage area 203 is shown as a tear in the boom. It should be noted that the oil boom repair system 201 can be used to repair other types of damages as well. In fact, the oil boom repair system 201 is able to reinforce an existing boom 202, as needed. Moreover, wind and water currents, which may have initially caused the damage area 203, can now be used to help secure placement of the oil boom repair system 201, as well as help form a tight seal 205 of the curtain 210 of the oil boom repair system 201 upon the existing boom 202. Additional support is also provided via the extra set of weighted chains 211 of the oil boom repair system 201. Preferred embodiments of the present disclosure can be added over a small area of an existing boom or to a large area over hundreds of feet in length.

Figure 3:
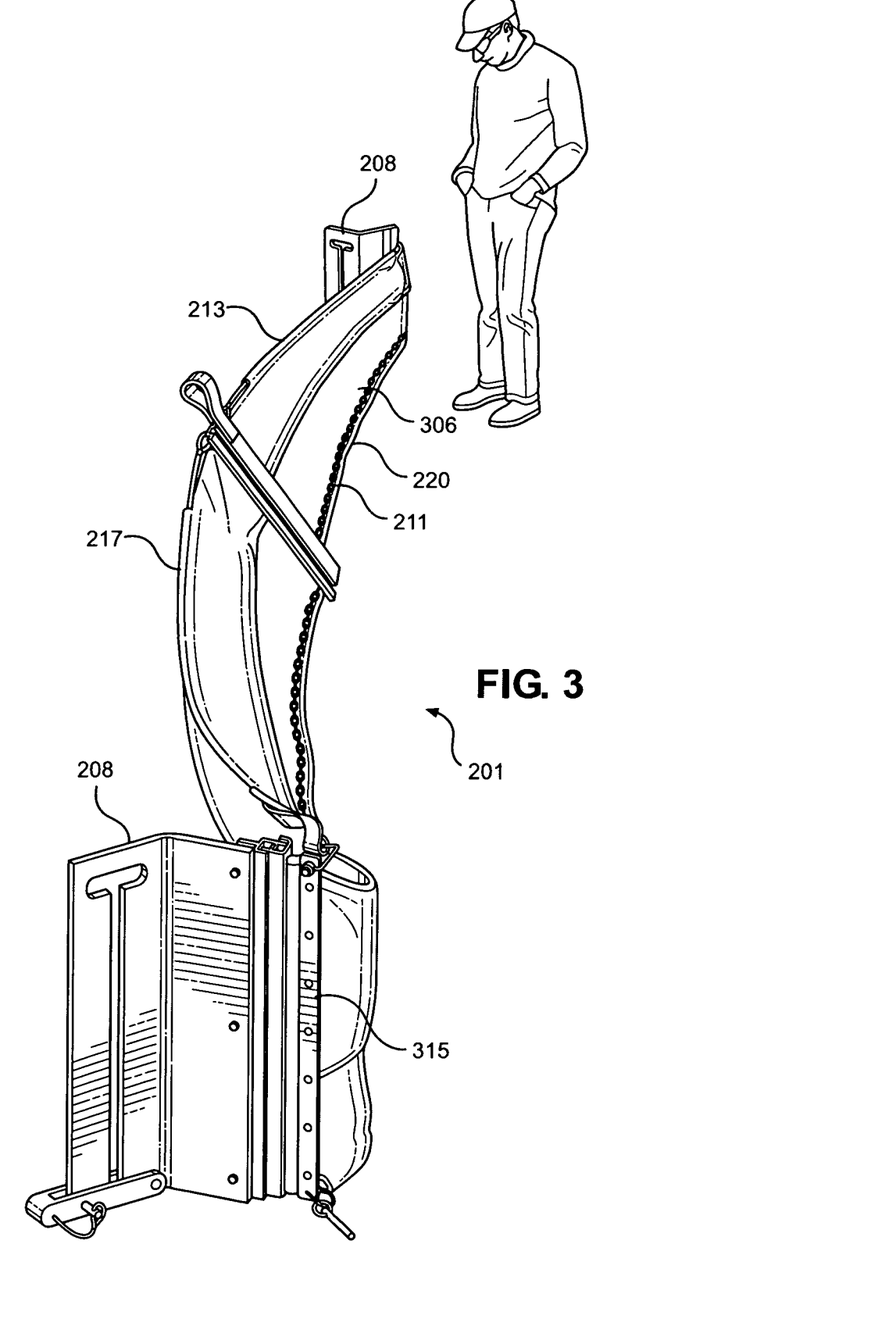
FIG. 3 shows another illustrative view of the boom repair system of the present invention.

FIG. 3 is a closer view of the oil boom repair system 201, which includes a pair of mirror image end connectors 208 supporting a curtain member 210. The curtain member 210 includes a top portion with one or more flotation members 213 secured thereto. The top portion is provided with a small opening for a cable 217 to run through, and a bottom portion 220 supporting a weighted chain 211. The curtain member 210 can be made of vinyl material. The vinyl material will help block oil, trash and debris in contaminated waters. If properly maintained the durable oil boom repair system will provide years of service to oil boom sections.

In the preferred embodiment, the curtain member 210 hangs below the surface of the water at a little over 12 inches to keep pollutants from creeping under the spill containment boom section. The flotation member(s) 213 in the top area keeps the oil boom repair system 201 float at the water line, and the lower portion 220 is used to support the weighted ballast, such as chain 211 that exerts a downward force on the curtain member 210 below the surface of the water. In one aspect of the invention, the oil boom repair system 201 utilizes a galvanized steel chain 211 to run through the length of the curtain member 210, thus, adding weight and additional rigidity to the boom.

The floatation member(s) 213 is sealed inside the curtain. In one of the embodiments, each floatation member is shaped as a cylinder and formed of closed cell foam. The curtain member 210 has sufficient longitudinal and vertical dimensions to cover the damaged section when stretched between the first end connector and the second end connector that have been engaged with the boom. Although different colors could be used, one of the embodiments of the oil boom repair system 201 may have a yellow curtain member 210, so that the oil boom repair system 201 system can be easily located in any weather.

Conveniently, the oil boom repair system 201 can be designed at any length to suit the needs of the damaged area of the existing boom. The adjustable length can be obtained through the use of conventional, universal slide connectors 315. FIG. 3 shows the use of these universal slide connectors 315 at the center of the curtain member 210, as well as at the ends of the curtain member between the curtain member 210 and the end connector 208. The universal slide connectors 315 can be made from marine-grade aluminum. The universal slide connectors 315 are constructed to hold hydrocarbons or debris from getting through in the areas where boom sections are connected. The oil boom repair system 201 can be deployed by operators 317 by having the operators 317 attach it to the existing oil containment booms from a floating vessel or stationary docks within minutes. The oil boom repair system 201 can be used in marinas, inland waterways, and in harbors.

Figure 4A:
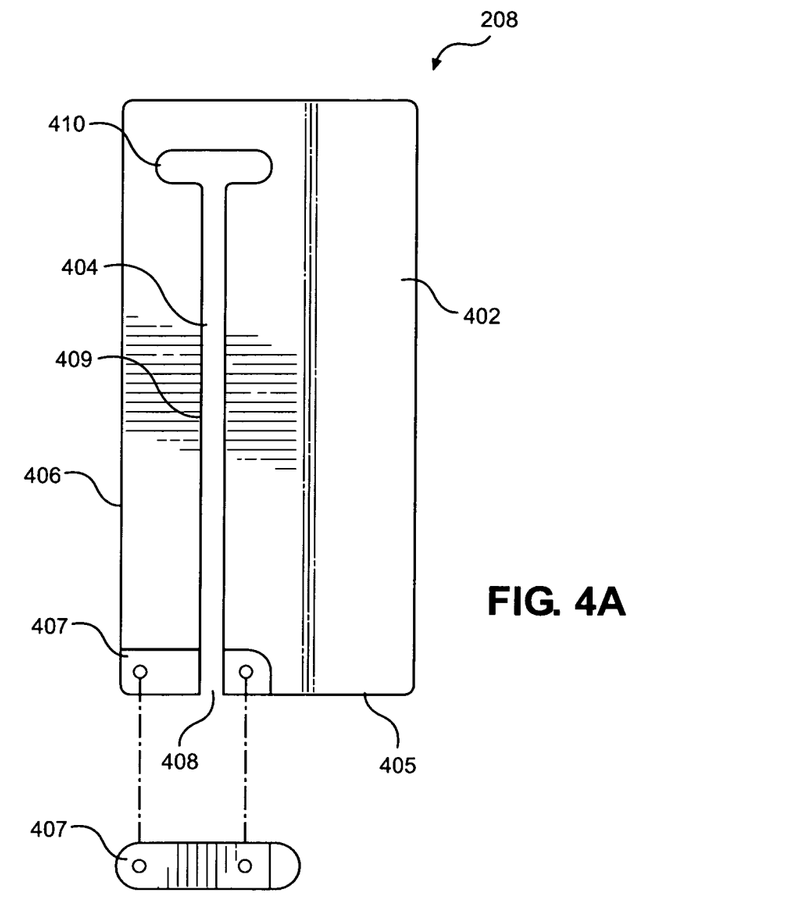
FIGS. 4A and 4B show a side and top view, respectively, of an end connector.
Figure 4B:
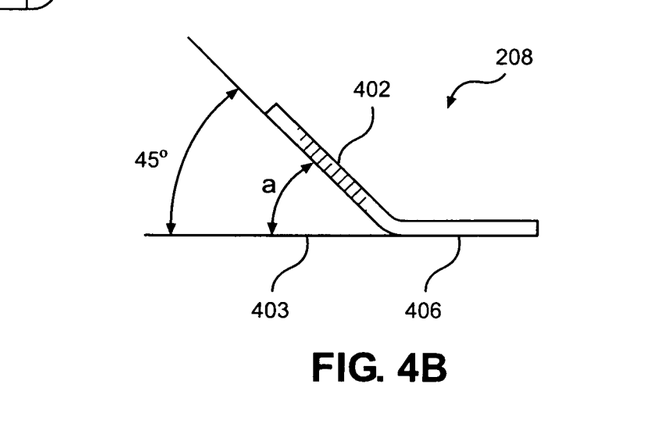

FIGS. 4A and 4B show the end connector 208 in more detail. FIG. 4A illustrates a side view, and FIG. 4B shows a top view of the end connector of the oil boom repair system 201. As can be seen in the drawings, the end connector 208 comprises a pair of integrally unitary connected elongated planar portions 402 and 406. The first portion 402 is inclined in relation to a normal plane 403 of the second portion 406; and the angle of inclination designated as "a" in FIG. 4B can be 45 degrees. This angle on the end connector helps to provide a tight curtain-to-curtain seal and attachment of the oil boom repair system to an existing boom. Other embodiments or variations may use a different angle. Wind and water currents also facilitate secure placement of the oil boom repair system, as well as help in forming a tight seal of the curtains of the oil boom repair system and of the existing boom.

In one of the exemplary embodiments, each end connectors 208 is about 30 inches in height, 10 inches in length, and 1 inch in width. Each end connector 208 can be made of marine grade aluminum.

A T-shaped slot 404 is formed in the second portion 406. The slot 404 extends from a bottom edge 405 a distance upwardly along the height of the end connector portion 406. A first part 409 of the slot 404 extends longitudinally upwardly from the bottom edge 405, and a boom-receiving opening 408 is defined by the bottom of the slot 404. The first part 409 of the slot 404 can be about 0.5-inch in width.

A second part 410 of the slot 404 is formed transversely to the longitudinal part 409 a distance from an upper edge 412 of the body. The second part 410 has sufficient width to allow an operator 317 to grasp the end connector 208 when positioning or removing the end connector 208 from the oil containment boom. In one exemplary embodiment the transverse part 410 of the slot 404 can be 3.5 inch in length to allow easy handling of the end connector 208.

A rigid locking bar 407 is pivotally secured to a lower part of the portion 406 a distance from the elongated slot 404; the locking bar is used for locking and securing the end connector 208 to an existing boom by securing the rigid locking bar 407 to bottom of the end connector portion 406 to close the slot opening 408. the closing area 406 via a lock-pin mechanism after the end connector 208 has been positioned on the damaged oil containment boom.

Figures 5A, 5B:
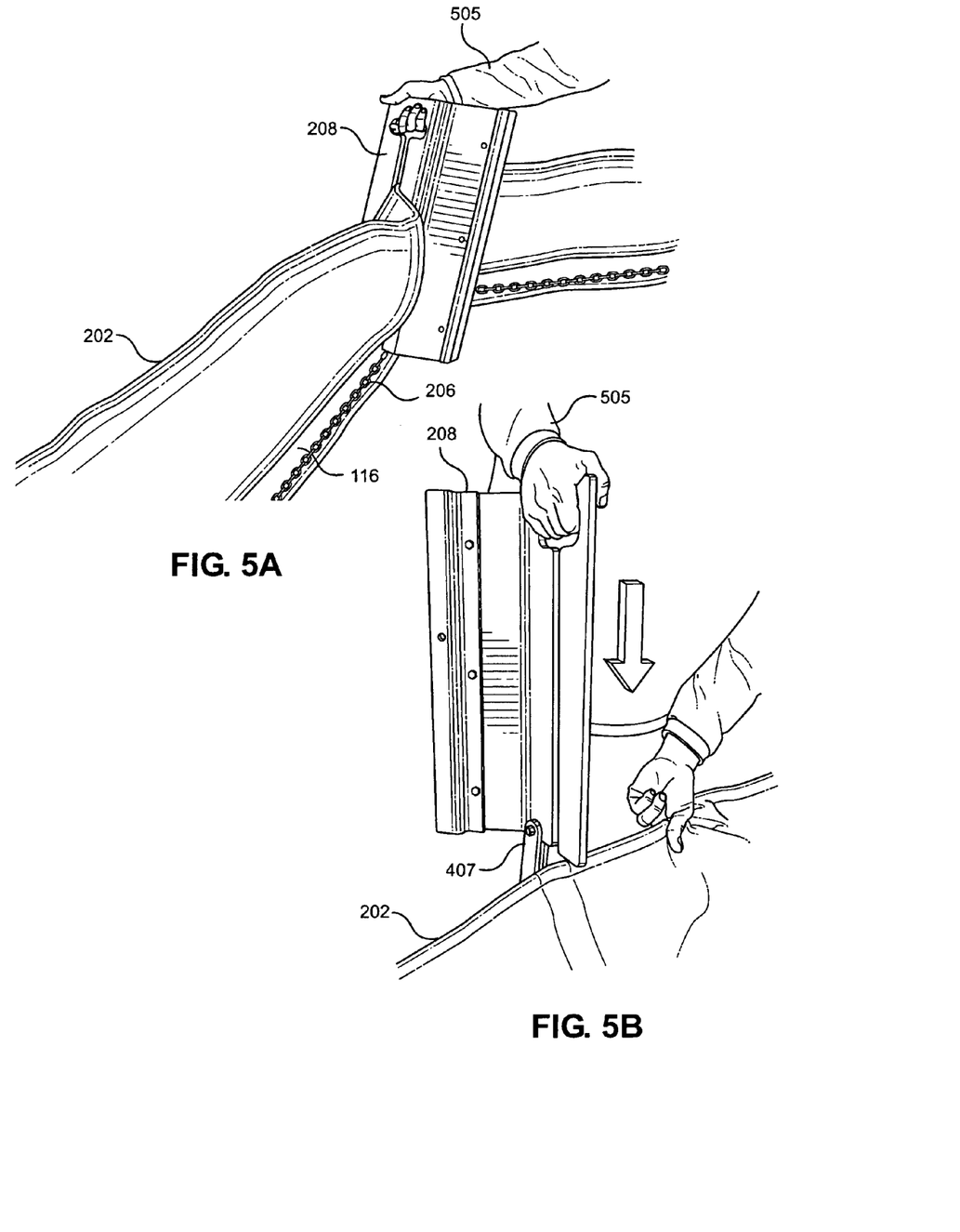
FIGS. 5A and 5B illustrate methods of attachment of the boom repair system of the present invention to an existing boom.

FIGS. 5A and 5B illustrate methods of attachment of the oil boom repair system end connector 208 to an existing boom 202. The attachment of the oil boom repair system end connector 208 to an existing boom 202 is relatively simple and can be completed in minutes. An operator 505 slides the end connector 208 of the oil boom repair system over the existing boom 202 using the slot 404. The existing boom 202 (although damaged or saturated) has a curtain 116 and weighted chain 206, as shown in FIG. 5A. The method for repairing or reinforcing a boom includes connecting one end connector 208 and a second minor image end connector to the existing boom 202 on another side of the damaged area of the boom 202. Next, the installation method includes locking the end connectors 208 in place via a lock-and-pin mechanism 407 by an operator 505, as shown in FIG. 5B. The lock and pin mechanism secures the oil boom repair system in place, and allows the repair to withstand strong wind and water currents.

Figures 6, 7:
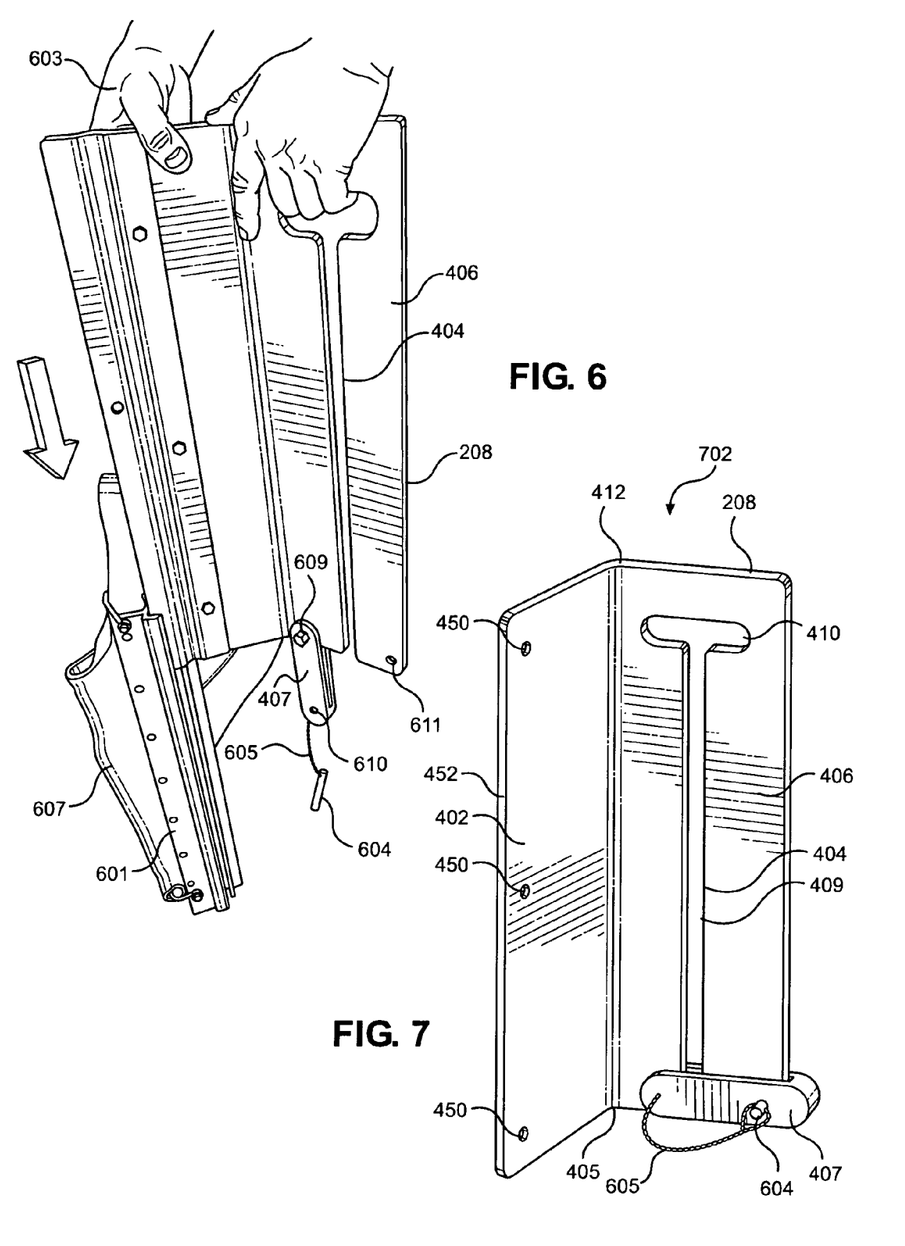
FIG. 6 illustrates the compatibility to a universal boom connector.
FIG. 7 illustrates a locked end connector of boom repair system of the present invention.

FIG. 6 illustrates the compatibility of the end connectors with a universal boom connector 601. Under this embodiment, the operator 603 simply slides the end connector 208 into the universal boom connector 601 and secures it in place. This feature of the invention makes it easy and suitable for other users in the oil boom containment industry. The curtain member 210 of the oil boom repair system includes and is already sewn or securely clamped onto a universal boom connector 601, similar to a typical, existing boom section. Next, the universal boom connector 601 slides onto the end connector 208. Typical connectors can be provided with the various jaw configurations by mating two connectors together. Typical connector/jaw configurations are defined by the American Society for Testing and Materials (ASTM) and also by industrial configurations. The present embodiment is compatible with connectors 601 that include two flat plates bolted through a fabric member, wherein a connecting jaw or other connecting interface is utilized to mate two connectors at the junction of the two boom sections. The present embodiment supplies a good connection that is secure and strong, and prevents oil leaks. The connection between the oil boom repair system end connector 208 and the universal connector 601 is important, because common failure of the oil boom is often at the connector.

The oil boom repair system's compatible end connector 208 is easy to manipulate. This is particularly important because rough weather make connections very difficult to maintain. In the preferred embodiment, the oil boom repair system end connector 208 is compatible with typical oil boom connectors that are extruded from aluminum alloy, and fabricated to standard oil boom connector lengths (12", 18", 24" or 36" lengths). The oil boom repair system end connector 208 is fabricated to connect with standard bolt-hole pattern plates. The present embodiment is compatible with standard industry connectors 601 that are either male or female. The oil boom repair system end connector 208 is designed to meet typical ASTM standards, and designed to be compatible with other connection profiles, including "Z" connectors and light duty mini-slide connectors.

FIG. 6 also illustrates the pin 604 and chain 605 of the locking mechanism for securing the oil boom repair system end connector 208 to an existing boom. The pin 604 and chain 605 is linked to a pivotal, rigid locking bar 407 that rotates to open and close the T-shaped slot 404 of the end connector 208. The rigid locking bar 407 is pivotally secured to a lower part of the second planar portion 406 a distance from the elongated slot. The locking bar 407 pivots about a pivot pin 609, which extends through the locking bar and is secured to the end connector portion 406. The locking bar 407 carries a flexible securing member, for instance chain 605 suspended from the locking bar 407 and configured for free pivotal movement about the pivot pin 609. A free end of the securing chain carries a locking pin 604. An aperture 610 is formed in the locking bar 407 a distance from the pivot pin 609. A corresponding opening 611 is formed in the second planar portion of the rigid body of the end connector 208. The locking pin 604 is configured for engagement within the aperture 610 of the locking bar 606 and the opening 611 in second portion 406 when the locking bar 407 is pivoted to align the aperture 610 and the opening 611. The locking bar 407 detachably secures the boom repair member on the portion of the oil containment boom, while preventing disengagement of the end connectors from the oil containment boom. When engaged with the boom the locking bar extends under the boom.

In alternative embodiments, the attachment or connecting portion of the present invention is made of a material having endurance and strength with respect to a mechanical load such as bending, tensile, compression, and kink, taking use in sea or waterways into consideration. It is desired that the entire oil boom repair system (including the end connectors) have a lightweight, except the bottom portion of the curtain.

FIG. 7 illustrates a locked end connector 208. The end connector 702 can be fabricated as any type of lightweight non-corrosive material, for instance marine grade aluminum. The T-shaped slot 404 allows for easy manipulation and installation by an operator. The slot 404 also allows for a top cable to pivot, and not bind up. In this illustration, bolt-receiving openings 450 can be seen spaced along a vertical edge 452 of the first portion 402. The openings 450 are designed to match spaced openings on the universal boom connector 601, as described above.

The elongated member or locking bar 407 closes the opening slot 404 of the end connector 208, after it is placed upon an existing boom. The opening slot 404 is closed and secured by the lock-and-pin mechanism. Different embodiments can utilize various locking mechanisms. For example, the end connector 208 can be secured and locked into place via a hitch pin (or any variation). These are simple forms of hardware used to temporarily mount or conjoin mating components. Virtually any type of pin requires at least one predrilled hole that is meant to hold and retain the end connector 208 has two mating segments are aligned and then held in position by the pin 604. In order to help prevent the loss of the pin 604, a 6-inch chain 605 connects the pin 604 to the rigid locking bar member 407. Other embodiments can utilize a different chain length, as needed.

In one embodiment, a hitch pin (as well as a clevis pin) requires an additional cotter pin inserted perpendicularly to lock the pin in position. In other embodiments, lynch pins, detent pins, snapper pins, safety spring pins, and toggle pins all contain integral locking mechanisms Like other pins, these mechanisms are meant to resist shear forces, which make them fundamentally different than bolts and screws. Sometimes these can be used as shear pins in mechanical overload situations.

As discussed via the presented embodiments, the oil boom repair system can be applied to existing booms that are already deployed in the open waters. The quick application makes it efficient, and avoids exposing shoreline to oil contaminants. The quick application also makes it less difficult to deploy during bad weather and stormy seas. Further, the oil boom repair system makes it easier to improve techniques used to clean up an oil spill, thus, cutting down response time. This contributes to the protection of various environments, including open seas, coastal waters, and wetlands. Pollution-control measures including containment and removal of the oil (either by skimming, filtering, etc), are able to improve with use and availability of the oil boom repair system. Oil spill countermeasures to clean up and remove the oil are selected and applied on the basis of many interrelated factors, including ecological protection, socioeconomic effects, and health risk. It is important to have contingency plans in place in order to deploy pollution control personnel and equipment efficiently. The rate of recovery of the environment when an oil spill occurs depends on factors such as oil composition and resource availability. The presented embodiments herein greatly improve the resources available for oil spill clean-up and containment.

Different embodiments for oil boom repair system are presented. In at least one embodiment, the oil boom repair system for boom repair includes two minor image end connectors with a portion fabricated at 45° from the plane surface of the other portion. The flexible liquid-impermeable curtain member is attached between the two rigid end connectors. The end connectors are also used to attach the oil boom repair system to a damaged, existing boom via the end connector's opening slot. This presented disclosure is used for repairing of reinforcing an existing boom by forming a tight seal between the curtain and existing boom with the use of the angled end connectors.

Another embodiment presented, introduced a suitable application method. This embodiment includes connecting one end connector of the instant oil boom repair system to an existing boom and engaging it to an existing boom connector. The second end connector is engaged with the boom on the other side of the damaged section so that the damaged area is covered by the extension of the curtain member, whereby the damaged section become isolated and sealed from the contaminated water. Both connections are attached by sliding the connectors over the existing boom. Next, the connectors are locked into place via a lock-pin mechanism. This embodiment also creates a tight seal over the damaged area, creating a "patch" to keep out oil contaminants from the protected area. The disclosed invention can be used to repair, patch, or reinforce an existing boom that could subject to the problems such as tears, saturation, or other damage.

Numerous other variations and modifications will become apparent to those skilled in the art once the above disclosure is fully appreciated. It is intended that the following claims be interpreted to embrace all such variations and modifications.

The invention claimed is:

1. An apparatus for repairing an oil containment boom having a damaged section, the apparatus comprising:
   a first end connector having an elongated planar body provided with a T-shaped slot, the slot extending from a bottom edge of the body a distance upwardly;
   a second end connector having an elongated planar body provided with a T-shaped slot, the slot extending from a bottom edge of the body a distance upwardly, the second end connector being a mirror image of the first end connector, the first end connector and the second end connector each being configured to engage the oil containment boom a distance from each other and on opposite sides of the damaged section wherein each of first end connector and the second end connector comprises a rigid body, the body comprising a first planar portion having a normal plane and a second planar portion, the second planar portion being oriented at an acute angle in relation to the normal plane of the first planar portion; and
   a liquid-impermeable curtain member extending between the first end connector and the second end connector, the curtain member having sufficient longitudinal and vertical dimensions to cover the damaged section when stretched between the first end connector and the second end connector engaged with the boom.

2. The apparatus of claim 1, wherein the T-shaped slot is formed in the second portion of each of the first end connector and the second end connector.

3. The apparatus of claim 1, comprising a locking bar means for closing the slot adjacent the bottom edge of the body.

4. The apparatus of claim 3, wherein the locking bar means comprises an elongated rigid locking bar pivotally attached at one of its ends to the second portion of the body adjacent one side of the slot, a flexible securing member affixed to the locking bar, and a locking pin secured to a free end of the securing member, the locking pin being configured to engage with the second portion of the body adjacent an opposite side of the slot.

5. The apparatus of claim 1, wherein the first portion of the body comprises an elongated vertical edge, and wherein a plurality of spaced apart openings are formed adjacent the vertical edge, said opening being configured to receive engagement members when connecting the end connector to a boom connector of the oil containment boom.

6. An apparatus for repairing an oil containment boom having a damaged section, the apparatus comprising:
   a first end connector having an elongated planar body provided with a T-shaped slot, the slot extending from a bottom of the body a distance upwardly;
   a second end connector having an elongated planar body provided with a T-shaped slot, the slot extending from a bottom edge of the body a distance upwardly, the second end connector being a mirror image of the first end connector, the first end connector and the second end connector each being configured to engage the oil containment boom a distance from each other and on opposite sides of the damaged section;

each of first end connector and the second end connector comprises a rigid body, the body comprising a first planar portion having a normal plane and a second planar portion, the second planar portion being oriented at an acute angle in relation to the normal plane of the first planar portion; and a liquid-impermeable curtain member extending between the first end connector and the second end connector, the curtain member having sufficient longitudinal and vertical dimensions to cover the damaged section when stretched between the first end connector and the second end connector engaged with the boom, while isolating and sealing the damaged section.

7. The apparatus of claim 6, wherein the T-shaped slot is formed in the second portion of each of the first end connector and the second end connector.

8. The apparatus of claim 6, comprising a locking bar means for closing the slot adjacent the bottom edge of the body.

9. The apparatus of claim 7, wherein the locking bar means comprises an elongated rigid locking bar pivotally attached at one of its ends to the second portion of the body adjacent one side of the slot, a flexible securing member affixed to the locking bar, and a locking pin secured to a free end of the securing member, the locking pin being configured to engage with the second portion of the body adjacent an opposite side of the slot.

10. The apparatus of claim 6, wherein the first portion of the body comprises an elongated vertical edge, and wherein a plurality of spaced apart openings are formed adjacent the vertical edge, said opening being configured to receive engagement members when connecting the end connector to a boom connector of the oil containment boom.

11. The apparatus of claim 6, wherein the T-shaped slot has a first part extending from the bottom edge of the body and a second part extending transversely to the first part, the second part being formed a distance below an upper edge of the body.

12. The apparatus of claim 6, wherein said first end connector and said second end connector are made of marine grade aluminum.

13. The apparatus of claim 6, wherein said curtain member is made of vinyl.

14. The apparatus of claim 6, wherein a buoyant flotation member is enclosed in a top portion of said curtain member.

15. The apparatus of claim 6, wherein the curtain member has a bottom portion and wherein a weighted ballast is secured to the bottom portion.

16. A method for isolating sealing a damaged section of an oil containment boom, comprising the steps:

providing a first end connector having an elongated planar body provided with a T-shaped slot, the slot extending from a bottom edge of the body a distance upwardly;

providing a second end connector having an elongated planar body provided with a T-shaped slot, the slot extending from a bottom edge of the body a distance upwardly, the second end connector being a mirror image of the first end connector, and providing a liquid-impermeable curtain member extending between the first end connector and the second end connector, the curtain member having sufficient longitudinal and vertical dimensions to cover the damaged section when stretched between the first end connector and the second end connector engaged with the boom;

lowering the first end connector over the oil containment boom on one side of the damaged section such that the oil containment boom is engaged within the T-shaped slot of the first end connector;

lowering the second end connector over the oil containment boom on opposite side of one side of the damaged section such that the oil containment boom is engaged within the T-shaped slot of the second end connector;

stretching the curtain member between the first end connector and the second end connector such that the damaged section us isolated and sealed against contaminated matter.

17. The method of claim 16, comprising a step of providing a locking bar means for closing the T-shaped slot.

18. The method of claim 17, wherein each of first end connector and the second end connector comprises a rigid body, the body comprising a first planar portion having a normal plane and a second planar portion, the second planar portion being oriented at an acute angle in relation to the normal plane of the first planar portion.

19. The method of claim 18, wherein the T-shaped slot is formed in the second portion of each of the first end connector and the second end connector.

20. The method of claim 18, wherein the locking bar means comprises an elongated rigid locking bar pivotally attached at one of its ends to the second portion of the body adjacent one side of the slot, a flexible securing member affixed to the locking bar, and a locking pin secured to a free end of the securing member.

21. The method of claim 20, comprising a step of engaging the locking pin with the second portion of the body adjacent an opposite side of the slot.

22. The method of claim 16, wherein a buoyant flotation member is enclosed in a top portion of said curtain member.

23. The method of claim 16, wherein the curtain member has a bottom portion and wherein a weighted ballast is secured to the bottom portion.

* * * * *